(12) United States Patent
Gonzalez Portales et al.

(10) Patent No.: US 8,501,127 B2
(45) Date of Patent: Aug. 6, 2013

(54) NEUTRALIZATION OF GASEOUS CONTAMINANTS BY ARTIFICIAL PHOTOSYNTHESIS

(75) Inventors: Luis Vicente Gonzalez Portales, Santiago (CL); Jean Paul Oliger Gonzalez, San Jose de Maipo (CL)

(73) Assignee: Masteridea S.A. (CL)

( * ) Notice: Subject to any disclaimer, the term of this patent is extended or adjusted under 35 U.S.C. 154(b) by 0 days.

(21) Appl. No.: 13/522,036

(22) PCT Filed: Jan. 10, 2011

(86) PCT No.: PCT/CL2011/000002
§ 371 (c)(1),
(2), (4) Date: Jul. 13, 2012

(87) PCT Pub. No.: WO2011/088584
PCT Pub. Date: Jul. 28, 2011

(65) Prior Publication Data
US 2012/0301377 A1    Nov. 29, 2012

(30) Foreign Application Priority Data

Jan. 19, 2010    (CL) .................................... 035-2010

(51) Int. Cl.
*B01D 53/34* (2006.01)
*B01D 53/38* (2006.01)
*B01D 53/74* (2006.01)
*B01D 53/76* (2006.01)
*C13K 1/00* (2006.01)

(52) U.S. Cl.
USPC ........ 423/210; 423/220; 423/235; 423/242.1; 422/129; 422/168; 422/187; 127/42

(58) Field of Classification Search
USPC .............. 423/210, 220, 235, 242.1; 422/129, 422/168, 187; 127/42
See application file for complete search history.

(56) References Cited

U.S. PATENT DOCUMENTS

| | | | |
|---|---|---|---|
| 3,364,656 | A | 1/1968 | Whiton et al. |
| 4,357,152 | A | 11/1982 | Duske et al. |
| 5,201,919 | A | 4/1993 | Jahn et al. |
| 7,334,397 | B2 | 2/2008 | Blomquist |
| 2008/0152567 | A1 | 6/2008 | Killough |
| 2009/0016948 | A1 | 1/2009 | Young |

FOREIGN PATENT DOCUMENTS

| | | |
|---|---|---|
| CL | 38227 | 8/1992 |
| CL | 38989 | 11/1995 |
| CL | 41569 | 8/2002 |

(Continued)

*Primary Examiner* — Timothy Vanoy
(74) *Attorney, Agent, or Firm* — DLA Piper LLP (US)

(57) ABSTRACT

An neutralization system includes a main chamber and a secondary chamber linked by a tube, wherein main chamber includes a gas main inlet duct and a gas outlet tube; a tube with nozzles that allows passage of steam in form of steam curtain; a propeller located at a center portion of main chamber; a first flexible tube placed on an upper side and exiting out of a top face of main chamber and rejoining main chamber in a main entrance of gases; at least two additional flexible tubes exiting a side of main chamber; an electric motor that extracts gases and allows pressurized gas to enter flexible tubes; an eviction-tube of liquid waste located at a bottom portion and inwardly of main chamber; an exhaust duct for treated gases located in a rear portion of main chamber which connects through a tube main chamber to secondary chamber.

13 Claims, 2 Drawing Sheets

FOREIGN PATENT DOCUMENTS

| | | |
|---|---|---|
| CL | 42130 | 4/2004 |
| CL | 44552 | 4/2004 |
| CL | 200200324 | 6/2007 |
| CL | 200101930 | 5/2010 |
| EP | 2 119 490 A1 | 11/2009 |
| JP | 3-60403 A * | 3/1991 |
| JP | 2005-34825 A * | 2/2005 |

* cited by examiner

NEUTRALIZATION OF GASEOUS CONTAMINANTS BY ARTIFICIAL PHOTOSYNTHESIS

RELATED APPLICATIONS

This is a §371 of International Application No. PCT/CL2011/000002, with an international filing date of Jan. 10, 2011 (WO 2011/088584 A1, published Jul. 28, 2011), which is based on Chilean Patent Application No. 035-2010, filed Jan. 19, 2010, the subject matter of which is incorporated by reference.

TECHNICAL FIELD

This disclosure relates to a gaseous pollutants neutralization system and a process through an artificial photosynthesis autonomous system denominated "SAFA."

BACKGROUND

It is helpful to take into account some technical and historical aspects of the problem of environmental pollution. The greenhouse effect is the best reference.

Throughout this century, and through further global industrialization, we have witnessed a worldwide environmental catastrophe, with high levels of pollutants coming from industrial processes, man, and their derivatives (such as transportation and other mobile sources). The foregoing has increased the natural concentration of gases in the atmosphere as well as added gases having a higher toxicity than those produced naturally. Among the gases that need to be neutralized are carbon monoxide (CO), carbon dioxide ($CO_2$), chlorofluorocarbons (CFCs), methane ($CH_4$), and nitrous oxide ($N_2O$).

Systems and processes exist that physically or chemically reduce or stop gaseous toxic waste from going into the atmosphere. So far, most efforts use physical means to filtrate particles through thin membranes, or employ electric shocks to negatively charge particles to capture them, or they simply use nozzles that inject certain base solutions (ammonia, urea, etc.) which act as catalysts of certain gases (hydrogen or $CO_2$) through chemical reactions which neutralize the gases when they react with each other, thus converting them into more stable substances, which are less harmful for the environment. However, production and maintenance of the equipment is very expensive.

CL38989 discloses a gases purifier having liquid wash drops, in counterflow of the gases in which the gases are treated by counterflow; and a series of pumps are used to splash the gases in an aqueous base solution.

CL38227 discloses a filter to retain suspension particles contained in the exhausts of internal combustion engines. In that case, there is a filter for particulate material which uses water in the process, through a series of jointed metal channels.

CL42130 discloses a wet filter device for all types of particles in industrial smokestacks comprising of a turbo extractor which incorporates a filter mesh, and filtration chambers associated with impeller means and liquid heaters and gas cooler elements. That is another type of filter that uses a mesh to capture large particles with gas coolers and heaters.

CL41569 discloses a treatment system for contaminated air comprising a station to capture air, a chamber for accumulating gases, an initial decontamination tunnel with floating mesh and sprinklers fed by water, a pool to decant residues, a particle dryer, and a pump to push the decontaminated water. That is another system that uses water as the base of its process, but it can only decant air particles on a large scale, making it almost impossible to apply.

CL01930-2001, published on Oct. 9, 2002, discloses a chemical-mechanic process to reduce contaminating gases having a first wash step which uses a chemical solution consisting of distilled water, sodium bicarbonate and urea: the latter two compounds at concentration from 5-8% each, followed by two more steps of filtration. In that application, contaminating gases are reacted with chemical substances at a fixed temperature. Hence, that application falls within a group of known catalysts of Reducción Catalítica Selectiva (SRC) (Selective Catalytic Reduction).

CL00324-2002 discloses a method to decrease pollutant emissions from stationary or mobile sources of combustion gases comprising the steps of separating the gases in multiple flows, decreasing the temperature of the gases by cooling, subjecting the gases to a washing step, and decanting the particulate material. That method consists of a series of aluminum pipes with different diameters in which the polluted gas passes through and at the same time a solution of distilled water is injected to produce a chemical effect.

CL 44552 discloses a method to purify exhaust gases of an engine, with an arrangement to recirculate gases, wherein a control device is adapted using temperature data and a valve device, to achieve a relationship between $NO_x$ and soot which is favorable for the regeneration of the filter. CL '552 refers to a vehicle catalyst device which reduces $NO_x$ and soot due to a system of recirculation of gases along with another series of factors.

EP 2119490, published on Nov. 18, 2009, discloses a system that reduces air pollution comprising an initial step for the liquid reduction of heavy metals, dust, pollen, and polycyclic aromatic hydrocarbons in particle form, a second step of oxidation in water of light hydrocarbons using oxygen from electrolysis, and a third step of transformation of chemicals such as $CO_2$ into bicarbonate by a reaction with inorganic carbonates. EP '490 uses chemical reactions with accompanying materials, as in the case of carbonate, to produce the desired effect (bicarbonate in this case). It uses electrolysis to liberate oxygen from water and to activate a reaction with certain hydrocarbons.

US 2009/0016948 A1, dated Jan. 15, 2009, discloses reduction of atmospheric carbon dioxide and production of carbon for subsequent use as fuel and, more specifically, refers to a dissolution process of atmospheric carbon dioxide in an adequate flow of alkali metal salt to form carbon and oxygen by an electrolysis process. The physical and chemical processes used to separate carbon from $CO_2$ oxygen, the reactants or catalysts used (electrodes), end up with results that are quite different. The electrolysis obtains oxygen through a basic solution with Mercury casted at very high temperatures (above 800 degrees Celsius).

In the current market and at industrial level, there are different types of abatement and particulate material control systems. These include inertial separators (or cyclones), wet strippers (scrubbers), hose systems, and electrostatic precipitators. However, none of these systems are concerned with gas treatment and processing. For treating and processing gases there are only absorption systems of certain gases. The problem is that they require a large investment, and they are only intended for some types of industrial processes such as $NO_x$ or Selective Catalytic Reduction. At the same time, none of the above systems are able to simultaneously control particulate material and processing of gases and obtain a desired yield.

The main systems that currently exist in the global industrial market are aimed at the reduction of particulate material. Within these systems are electrostatic systems, gas scrubbers, cyclones and bag filters. However, the effectiveness of these systems in capturing more volatile substances is limited to what may contain residual particulate material. As for the cost, it varies according to efficiency. The most expensive costs are the initial investment as well as maintenance costs for those systems that can capture 99% of particulate material.

SUMMARY

We provide a neutralization system including a main chamber and a secondary chamber linked by a tube, wherein the main chamber includes a gas main inlet duct and a gas outlet tube, a tube with nozzles that allows passage of steam in the form of a steam curtain, a propeller located at a center portion of the main chamber, a first flexible tube placed on an upper side and exiting out of a top face of the main chamber and rejoining the main chamber in a main entrance of the gases, at least two flexible tubes exiting a side of the main chamber, an electric motor that extracts gases and allows pressurized gas to enter the flexible tubes, an eviction-tube of liquid waste located at a bottom portion and inwardly of the main chamber, an exhaust duct for treated gases located in a rear portion of the main chamber which connects the main chamber through the tube to the secondary chamber, the secondary chamber including an entrance for gases coming from the main chamber and a gas outlet duct located on an upper end thereof, multiple foam units connected together wherein each junction of the foam units has a perforated aluminum sheet and a polyester fiber cloth with a high degree of absorption, a high powered centrifugal extractor which facilitates output of gas located outside the upper end of the secondary chamber, and an evacuation tube for liquid waste which allows output of fluid located at the bottom of the secondary chamber.

We also provide a process of neutralization of gaseous pollutants from combustion including: i) causing gases from a pollution source to enter a main chamber and contact a curtain of steam, deflecting and slowing down the gases by moving an internal propeller, sucking the gases through an external extractor motor, sending the gases to flexible tubes, introducing the gases back into the main chamber, and causing gas recirculation, ii) binding the gases to each other with their chemical elements related by the kinetic energy achieved through the recirculation, condensing and precipitating compounds obtained in circular walls of the main chamber and deposited in a bottom portion of the main chamber, and iii) causing the gases energetically treated in i) to enter a secondary chamber, releasing oxygen together with the gas waste outwardly from an external output of the secondary chamber, and capturing liquid residue obtained from the process.

DETAILED DESCRIPTION

Figure 1:
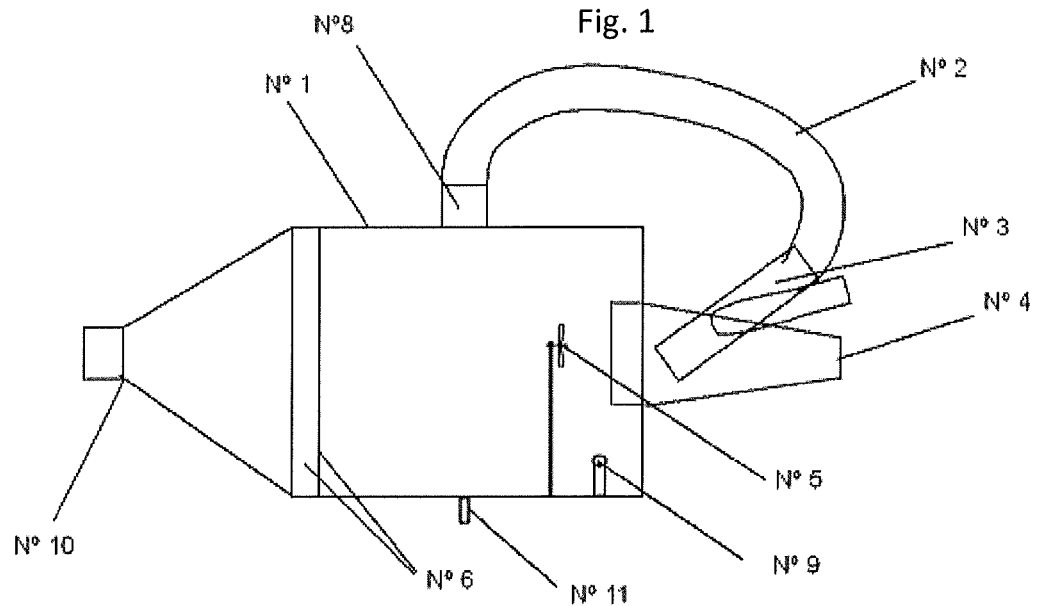
FIG. 1 shows a side longitudinal section of a main chamber.
Figure 2:
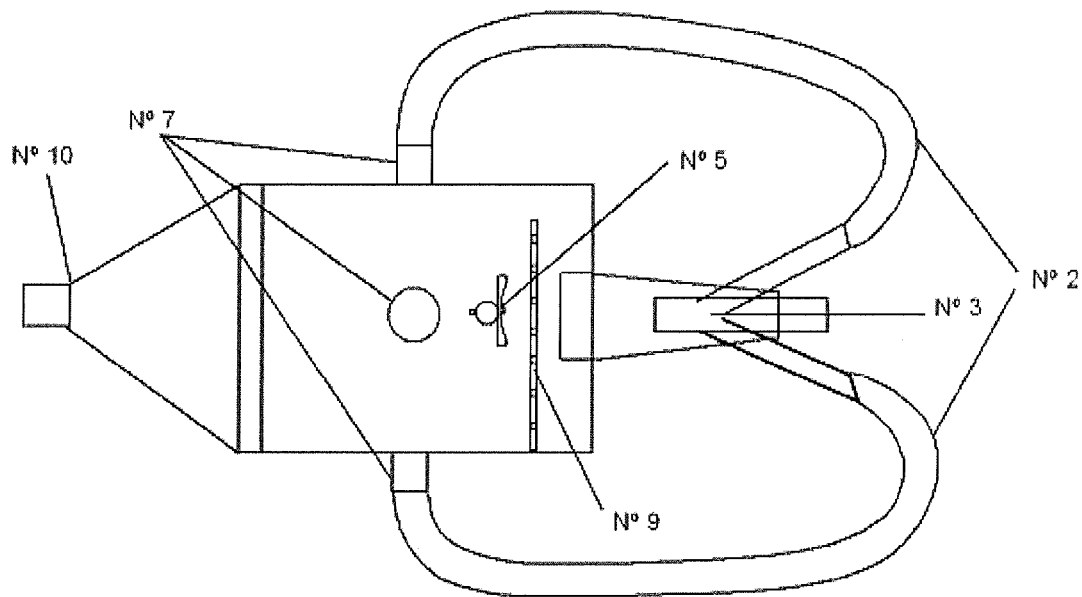
FIG. 2 shows an upper longitudinal section of the main chamber.
Figure 3:
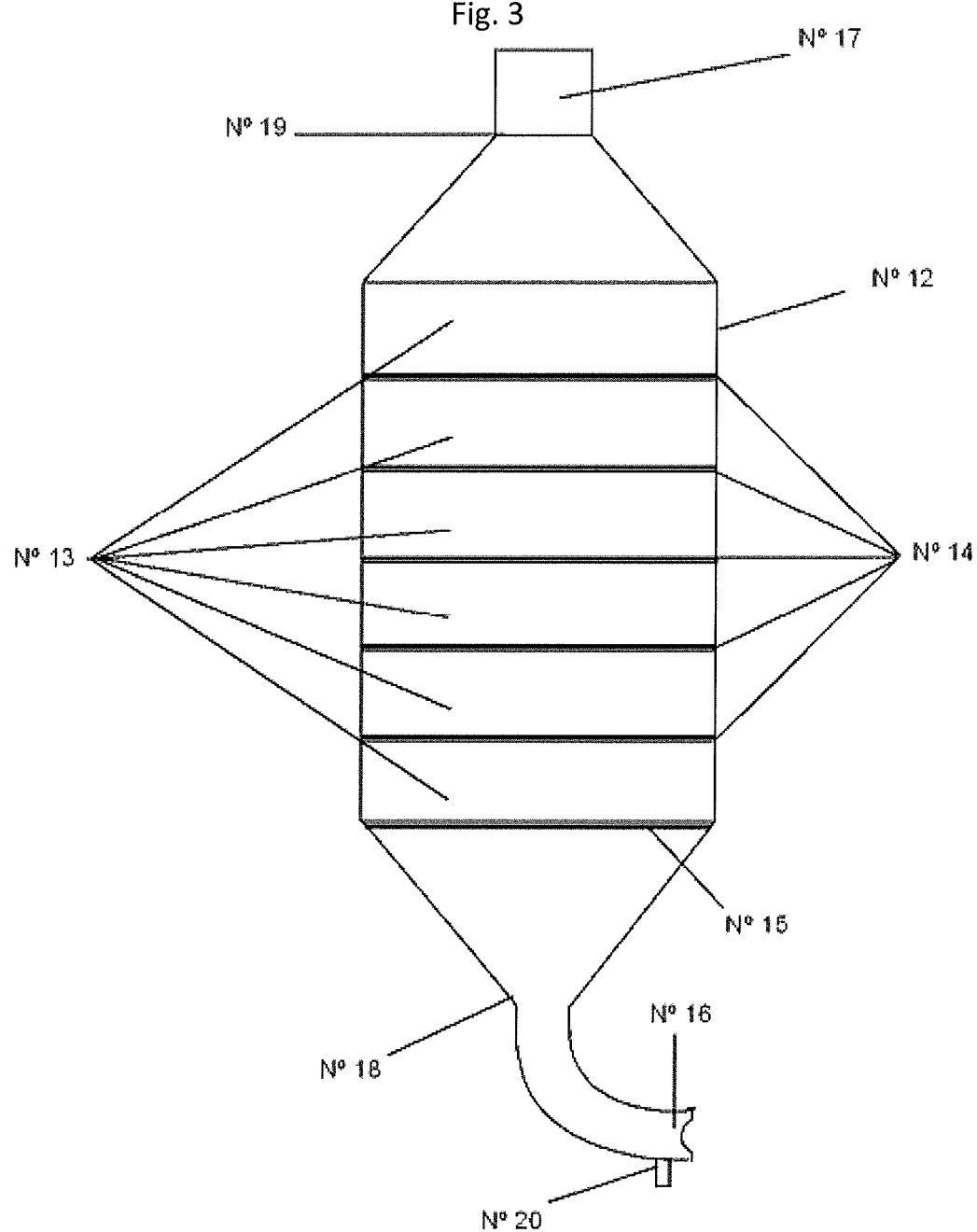
FIG. 3 shows a side longitudinal section of a secondary chamber.

We are able to control particulate material and processing of gas at a low cost while improving upon existing systems in terms of efficiency. We are able to capture and transform toxic gases into more harmless substances with minimum odor.

We capture and process the main gases causing the greenhouse effect which are produced by stationary sources of pollution, particularly $CO_2$, $NO_x$, and $SO_2$. These gases are from smelters, power plants, industrial furnaces, and high-powered generator sets. All of the gases mentioned are most responsible for acid rain and global warming.

We found a new neutralizing system of gaseous pollutants which neutralizes toxic gas components, first releasing the lighter molecules (oxygen), to the atmosphere, and partly transforming these gases into harmless elements that can be released into the environment.

We thus designed a gaseous pollutants neutralizer system that processes toxic components to produce oxygen and harmless liquid waste by a process of chemical symbiosis or molecular fusion using physical-chemical principles similar to the process of natural photosynthesis.

We provide a system of artificial photosynthesis that neutralizes harmful elements from any type of combustion, thus reducing the initial volume and pressure of the gases. This is done through the kinetic energy produced by accelerated recirculation of gases through the molecular or gas resonance principle. Physical and chemical processes then release oxygen and harmless liquid substances. The system is comprised of a main chamber and a secondary chamber linked by a tube. The main chamber is comprised of:

a main input gas pipe and a gas outlet;
a tube with nozzles that allows the passage of steam in a steam curtain;
a propeller located inside of the main chamber;
a first flexible tube placed on the upper side and exiting from the top face of the main chamber. It rejoins the main chamber in the main entrance of the gases. The main chamber has at least two additional flexible tubes leaving the sides of the main chamber;
an electric motor to extract gases that allows the pressure of the gases to enter through a flexible tube;
an eviction tube of liquid waste located at the bottom on the inside of the main chamber; and
one exhaust duct for treated gases located in the rear of the chamber, which connects through a tube to the main chamber with a secondary chamber.

The secondary chamber is comprised of:
an inlet gas tube coming from the main chamber and a gas duct outlet located on the upper end;
multiple foam units connected together and each junction of the foam units has a perforated aluminum foil and a polyester fiber cloth with a high degree of absorption;
a high powered centrifugal extractor that facilitates a gas outlet located outside the upper end of the secondary chamber; and
an evacuation tube for liquid waste located at the bottom of the secondary chamber which allows for the removal of liquids.

We also provide an artificial photosynthetic process to neutralize harmful elements from any type of combustion, reducing the initial volume and pressure of the gases through the kinetic energy produced by the accelerated recirculation of the gases through the molecular or gas resonance principle. Oxygen is then released along with harmless substances by physical and chemical processes. They are comprised of the following steps:

i) Step one: gases from the pollution source enter the main chamber and the gaseous mass makes contact with a curtain of steam. Then, the gases are deflected and slow down moving into an internal propeller. Next, the gas is sucked into a tube by an external motor, the gaseous mass moves toward the flexible tubes, at which point it is introduced back to the main chamber, allowing the gas to continuously recirculate. The reason for this is to produce an energy charge which causes the gaseous mass to be soluble in water vapor.

ii) Step two: allow the gases to bind to each other with their chemical elements through the kinetic energy gained in the recirculation process. The compounds obtained in the circular walls of the main chamber condense and precipitate, and then are deposited at the bottom of the main chamber.

iii) Step three: The energetically treated gases from the first step enter the secondary chamber, facilitating the physical and chemical action of gases, in which they are drawn together by their similar elements, freeing the oxygen. Oxygen is released together with the gaseous waste outwardly towards the external output of the secondary chamber with the aid of a high-performance centrifugal extractor, capturing the liquid residue obtained in this process, and eventually eliminating the liquid residual by a stopcock that is located at the bottom of the secondary chamber.

The neutralizing process of contaminated gases is comprised of two main characteristics described below:

An Elementary Physical-Mechanical Action

In the first stage, gaseous pollutants enter a processor or main chamber where mixing occurs and there is a fusion of gases. The main chamber is airtightly sealed. The gases enter the main chamber through an external centrifugal extractor. Once the gases enter the main chamber of the system, they first face a curtain of saturated water vapor that is at least 100° C. Then, the gases make contact with a concave propeller blade with a diameter equivalent to the diameter of the main entrance tube of the gases which acts as a brake and diffuses the gases that enter.

Once the gases are inside the main chamber they are mixed with the saturated water steam that is injected or sprayed into the main chamber. The saturated water steam is injected or sprayed through a nozzle tube that forms the curtain of steam. The nozzle tube is located at the bottom of the main chamber. This mechanism for injecting or spraying saturated water steam also helps to lower the gas temperature in this step.

In the second step, gases that have mixed with water steam enter three corrugated aluminum flexible tubes which are twice the length of the outer main chamber. The main flexible tube is located on top of the main chamber and two tubes are located on the sides of the main chamber. At the top of the main chamber there is an electric motor attached to the upper main duct.

In the second step of the process, the accelerated gas recirculates, generating a sort of “gas or molecular resonance” from the kinetic energy released by the particles of the gases through a concentric centrifugal effect that occurs in the flexible tubes. This is when the accelerated air is able to mix with the gases and condense efficiently and quickly. The pressure from the inlet gases (which can vary from 1 to “x” bar) decreases, thus indicating that the system is processing contaminants. Through the process of recirculating the gases, the temperature of the gas decreases at least 10° C. in relation to the temperature of the original input, and the original pressure input of these gases falls by a bar or less.

As the temperature decreases, it increases the effectiveness of the physical and chemical reactions involved in the process which convert the gaseous mass into a liquid mass that subsequently drops to the bottom of the main chamber by force of gravity.

In the third step of this process, a permeable filter is produced in a sealed cylindrical device, where the treated gases are supersaturated with moisture and the moisture covers each of the internal filters, where the conversion of saturated water steam is performed. This coalesces with the entire exposed surface of each plastic foam filter contained in the secondary chamber to thereby make the physical-chemical process more efficient. The gases entering the secondary chamber have a temperature lower than the original temperature of the gas inlet into the main chamber. The gases are rich in moisture and they have a positive or negative energy charge, which are for the most part, captured and neutralized. This allows for the release of oxygen molecules.

A Physicochemical Secondary Action

At first, this composite action—initiated in the first step and completed in the third step—is a physical action.

In the secondary action, there are three major factors involved: the temperature inside the chamber, the internal pressure of the chamber, and the humidity of the gases and water vapor.

This action produces a transformation of the particulate material into thicker material by joining with the atomically less dense (or lighter) material simultaneously and in an apparent chain reaction. This is due largely to the molecular or gas resonance process initiated in the second step. It is possible that there is an ion charge (positive or negative) to the more sensitive molecule such as carbon, nitrogen and sulfur. These molecules are attracted to the plastic foam filter installed in both the primary and secondary chambers, continuously and permanently. Energy loading gas molecules facilitate the chemical reaction of gases in the presence of steam to form more stable molecular bonds.

In this reaction, there are different neutral compounds (such as bicarbonates and sulfates to a lesser extent), which makes the main pollutants (such as CO, $CO_2$, $NO_x$ and $SO_2$) easier to solute. Pollutants are thus converted from a primarily gaseous state to a liquid state and, then, upon drying, they become solids, forming bicarbonates, sulfates or glucose (in a greater percentage than the rest of the residues) and possibly starch and cellulose molecules. Put simply, there is an atomic bonding effect which transforms gases into higher molecular weight elements than their natural state (forming glucose molecules and probably starch and cellulose). This mechanism precipitates the elements of higher molecular weight and more dense molecular structure to an inner processing area. This also helps the system to more effectively absorb and capture substances of lower molecular weight and certainly more volatile, but it always leaves free oxygen molecules to produce chemical reactions that join each stable chemical compound (carbon, nitrogen, hydrogen, sulfur and the like). The simple chemical compounds are transformed into more complete chemical elements with higher molecular weight and denser molecular structures. As a result, the process frees oxygen molecules, thus releasing a higher percentage of oxygen (in relation to the flow of gas entering and leaving the system) than were initially introduced in the first step of the process.

This process, for the most part, is homologous to natural photosynthesis, since $CO_2$ and $H_2O$ are used to produce liquid glucose, and a large amount of pure oxygen is released at the end of the process. Formation of other chemical compounds from gases other than $CO_2$ is not obtained or derived from glucose-rich carbon bonds, but rather obtained depending on the molecular equivalent gas (e.g., $SO_2$ involves other molecular combination with $H_2O$ molecule).

According to the results obtained from the detailed examples below, our system purifies and decreases the pressure and the original volume of gas, converting the material into less toxic compounds in comparison to the material that initially entered the system. This causes molecules to disintegrate, possibly due, as mentioned above, to the molecular or gas resonance principle, and the kinetic energy released therein, new atomic bonds are formed with similar elements, changing the original molecular composition of the compounds. The efficiency of our system is such that the treated liquid also neutralizes the presence of bacterial microorganisms which prevents formation of rust or other bacterial flora within the system. The theoretical-scientific principle achieving water vapor molecular symbiosis with the other toxic gases that make the system work is unique and exclusive in the world and it is unparallel in any physical-chemical process currently being studied by universities or specialized centers in the field. We achieve a molecular change similar to photosynthesis, but instead of using light energy, kinetic energy and molecular resonance or gas resonant is used to achieve the same phenomenon. This is known as artificial photosynthesis.

Our device carries out the process of neutralizing gaseous pollutants. The device is comprised of two structures, a main chamber and a secondary chamber connected together by a stainless steel round tube, or other material that is made of plastic polymers.

Referring now to the Drawings, FIG. 1 shows the main chamber (1) which is a stainless metal or plastic polymer cylindrical shape adapted to its function. The inner surface of the primary chamber is coated with steel material or polymer plastics to facilitate decantation of saturated vapor gases. On the outside of the main chamber there are three flexible tubes (2) made of plastic or aluminum having concave internal relieves. A first flexible tube exits the top of the main chamber (1). Two other flexible tubes (2) emerge from each side of the main chamber (1). Each of the flexible tubes (2) ends in a tube that is attached to a duct (3) at the entrances of the main chamber at a point about equidistant from the center of the chamber. The flexible tubes exiting the main chamber are made of plastic or aluminum, and they have a toothed interior with semicircular concave surfaces and flow into the main duct (4) of inlet gas. The main duct (4) where the gases enter has a truncated cone shape. The final internal diameter of this duct is twice as wide as the outer diameter inlet, thereby facilitating the waste liquids to drain away within the principal chamber. The diameter of the main flexible tube is equivalent to 15%-20% of the internal diameter of the main chamber, and the lateral flexible tubes have a diameter equivalent to 10% of the internal diameter of the main chamber. The flexible tubes have a toothed surface which has a separation between folds corresponding to 5% of the internal diameter of each flexible tube and a height corresponding to 2.5% of the diameter of each tube.

They are located on both sides of the main chamber, at an equal distance from each other. The duct (3) reaches the tubes. They are simultaneously joined to each of the flexible tubes (2). The duct (3) is located at the main entrance of the toxic gases where recirculation occurs. The entrance of the toxic gases also houses the main duct (4) of inlet where toxic gases are introduced to the main chamber via an external extractor.

Once inside the main chamber, the gases are received by a propeller (5) that has concave flanges serving as a primary barrier to the gas, causing the gas to decrease its strength and direction. The propeller (5) located in the center of the main chamber has concave flanges and uses the force of the entering gases to rotate and thus producing the deviation of the mixed gases towards the inner walls of the main chamber. Due to the inertial force, the gases are led to the rear of the main chamber where the gases encounter the first filtering step of the system which consists of a plastic foam sheet of expanded polyurethane foam with a density of 25 $K/m^3$ and is at least 10 cm thick, and a perforated aluminum plate or sheet that sits on the rear end (6) of the main chamber (1).

The gases are diverted to the main chamber walls, addressing the effect of this inertial force and centrifugal characteristic of this process, towards the entrance of each flexible tube (7) where the gases lose temperature and bind together due to the centrifugal effect that is generated in each of the flexible tubes, which is also facilitated by the shape of the flexible tubes and through an electric extractor motor (8) located at the entrance of the main flexible tube (7). The electric extractor motor (8) allows gases to mix with water vapor, which are then introduced back into the main chamber through three flexible tubes, producing a continuous circulation of gases. The electric extractor motor can also be located, if the model of fabrication requires so, on the other two flexible tubes, wherein the highest extracting power motor is located on a flexible tube that is wider and higher, and the two other motors have half the extracting power as the principal motor. They can be located on the side of the principal chamber at the exit of the other flexible tubes to increase the recirculation process.

The cylindrical structure of the main chamber of the device ends in a funnel-type terminal truncated cone form (10). The terminal truncated cone form (10) causes the treated gas to enter the second device structure, or secondary chamber, with a greater force, which causes the treated gas to settle in the first structure of the device, or primary chamber. Furthermore, in the inside bottom of the main chamber, the system has an evacuation pipe (11) with a stopcock which serves to dislodge the processed material resulting from the process which at this point is in a liquid state.

The secondary structure, or secondary chamber (12) shown in FIG. 3, is made of corrosion resistant metal or plastic polymers and also has a cylindrical shape with truncated cone ends. In the initial part of the secondary chamber (12) there are a series of foam units (13) used as converters of saturated water vapor and as absorbers of wet gas coming from the main chamber and as filter to retain the contaminants. The secondary chamber has at least 5 units of plastic foam at least 10 cm in thickness, and a density of 25 $K/m^3$ (kilograms per cubic meter). The foam is made of expanded polyurethane which is the best compound used and tested so far because of its high retention capacity and water absorption. The plastic foam units convert the saturated vapor from the main process in which water is bonded across the exposed surface of the foam, facilitating the physical-chemical process above described as well as the filtering of gases. Foam units are separated by thin perforated aluminum sheets (14) covered with polyester fibers located between each gap of the plastic foam units (13). Before the of foam units (13), in the bottom of the secondary chamber there is a metal mesh (15) or a plastic polymer mesh which serves both to support the weight of foam units (13) and the thin perforated aluminum sheets (14), when this secondary chamber is installed vertically in relation to the main chamber. The secondary chamber has an airtight structure.

The outer lower part of the secondary chamber has a tube (16) of inlet gas coming from the main chamber. The tube (16) can be either straight or curbed, depending on the position of the secondary chamber, links the main chamber with the secondary chamber. The upper end of the secondary chamber has a high-performance centrifugal extractor (17). Each of the two ends of the secondary chamber has truncated cone structures made of corrosion resistant metal or plastic polymers.

The structure of the lower end (18) facilitates the mixing and pressure entering of the gases, and the upper end structure (19) allows the gases to exit. The upper end structure (19) has an evacuation opening slightly wider than the lower end. The tube (16) connecting the main chamber with the secondary chamber has an evacuation tube (20) allowing the liquid, or liquid waste produced by this step to evacuate if the plastic foam has not absorbed it.

Example of an Application of Our System:

Once in the inside of the main chamber, the gases deflected by the central propeller (5) are mixed with saturated water steam which is injected or sprayed into the main chamber at a temperature not greater than 100° C. and at a pressure generally ranging between 1 and 3 bars, depending on the humidity of the gases. To facilitate the process of lowering the gas temperature, and thus helping to neutralize and release oxygen, gases are passed through a nozzle tube (9) that forms a curtain of steam of high concentration of moisture at a temperature not greater than 100° C. The nozzle tube (9) is located at the inlet of the system's main chamber (1). The nozzle tube (9) is attached to a vaporizer located on the inside or outside of the main chamber.

The pressure in the accelerated recirculation process drops to levels of 1 Kg/cm$^2$ or 1 bar. This indicated that the system is processing contaminants. The inlet temperature of the gases to the main duct (4) of the truncated cone shape is usually between 50° C. to 100° C., but once the gases enter again into the main chamber through the recirculation process, the temperature of the gases drops abruptly, falling to a temperature between 39° and 42° C. (depending on the input temperature of the gas). In this example, the temperature of the inlet gas is 55° C. In optimum performance, inside the main chamber the inner recirculation temperature of the flexible ducts is about 45° C.

Our system is able to absorb more than 90% of all gases and 99% of the particulate material entering it. We were able to verify the efficiency of the system in the following experiment. At the outlet of the exhaust pipe of an electric generator running on gasoline at 1 hp (746 Watts), the system operate for more than two hours, obtaining an actual decrease in $CO_2$ and CO of 90%, NOx decreased by almost 62%, and oxygen increased from 8% to 19.7%. We observed at the input there was significant volumetric pressure, i.e., a volumetric pressure inlet 60 l/min, obtaining a volumetric output pressure of approximately 5 to 1 l/min. All the measures recorded here were made on a percentage relative to the gas inlet and outlet of the system.

The tests performed verify that we can achieve an output between 18.5% and 19.7% with an actual increase of over 250% between the percentage of oxygen entering the system after the combustion process versus the oxygen released once the gases pass through the device. Therefore, the device and process would eventually achieve a percentage of totally breathable air. The results improve substantially when the same system is coupled or attached to two or more of this type of device for continuous operation. It is possible that, when combined, we can produce the first closed-loop combustion in the world where adequate oxygen is produced in part by the device without contaminating the atmosphere with an additional harmful gas.

Now we will describe in detail each section of the system, known as autonomous system of artificial photosynthesis or SAFA, to clearly define each of the appended claims we have made about the system and the processes.

The invention claimed is:

1. A neutralization system comprising a main chamber and a secondary chamber linked by a tube,
    wherein the main chamber comprises:
    a gas main inlet duct and a gas outlet tube;
    a tube with nozzles that allows passage of steam in the form of a steam curtain;
    a propeller located at a center portion of the main chamber;
    a first flexible tube placed on an upper side and exiting out of a top face of the main chamber and rejoining the main chamber in a main entrance of the gases;
        at least two flexible tubes exiting a side of the main chamber;
    an electric motor that extracts gases and allows pressurized gas to enter the flexible tubes;
    an eviction-tube of liquid waste located at a bottom portion and inwardly of the main chamber;
        an exhaust duct for treated gases located in a rear portion of the main chamber which connects the main chamber through the tube to the secondary chamber;
    the secondary chamber comprising:
        an entrance for gases coming from the main chamber and a gas outlet duct located on an upper end thereof;
        multiple foam units connected together wherein each junction of the foam units has a perforated aluminum sheet and a polyester fiber cloth with a high degree of absorption;
        high powered centrifugal extractor which facilitates output of gas located outside the upper end of the secondary chamber; and
        an evacuation tube for liquid waste which allows output of fluid located at the bottom of the secondary chamber.

2. The system according to claim 1, wherein the main chamber is cylindrical and has a truncated cone shaped end funnel, and a truncated cone shaped inlet duet gas, made of anticorrosive metal or a special plastic suitable for temperatures, an internal surface of the main chamber is coated with steel or plastic polymers to facilitate decantation of saturated vapor gases, which terminates in a straight or curved steel tube which connects the main chamber to a secondary chamber.

3. The system according to claim 1, wherein the flexible tubes emerging from the main chamber are made of plastic or aluminum, with a toothed concave semi-circular shape interior that flows into the main entrance of the gases, two flexible tubes exit each outer side of the main chamber at equal distances from the inlet duct of the gaseous pollutants, and the flexible tubes are attached to the main chamber by a steel tube or plastic polymer attached in equal distance to the main gas inlet duct having a truncated cone shape.

4. The system according to claim 1, wherein the main chamber has a tube with nozzles located at the bottom of the main chamber which allows passage of steam and which is attached to a vaporizer.

5. The system according to claim 1, wherein the propeller is made of concave metal or plastic blades and is operated by dynamic force of the inlet gases, where the propeller is located immediately after the nozzle tube.

6. The system according to claim 1, wherein the secondary chamber is cylindrical and has funnel-type truncated cone ends, is made of corrosion resistant metal or plastic, and is airtight.

7. The system according to claim 1, wherein the secondary chamber has at least 5 units of plastic foam, is at least 10 cm high and is 25 K/m$^3$ (kilo per cubic meter) of density, the foam units are made of expanded polyurethane, and are joined together, each joint having a perforated aluminum sheet that supports the polyurethane foam and between the aluminum sheets there is a thin layer of polyester fiber of a high grade of absorption, wherein in front of the foam units, in the bottom of the secondary chamber there is a metal mesh or anticorrosive plastic polymers that bear weight of the foam units and the aluminum sheets when the secondary chamber is used vertically with respect to the main chamber.

8. The system according to claim 1, wherein the rear portion of the main chamber further comprises a sheet of expanded polyurethane plastic foam having at least 10 cm thickness and a density of 25 K/m$^3$ and a sheet of perforated aluminum.

9. A process of neutralization of gaseous pollutants from combustion comprising:
   i) causing gases from a pollution source to enter a main chamber and contact a curtain of steam; deflecting and slowing down the gases by moving an internal propeller; sucking the gases through an external extractor motor; sending the gases to flexible tubes, introducing the gases back into the main chamber, and causing gas recirculation;
   ii) binding the gases to each other with their chemical elements related by the kinetic energy achieved through the recirculation, condensing and precipitating compounds obtained in circular walls of the main chamber and deposited in a bottom portion of the main chamber; and
   iii) causing the gases energetically treated in i) to enter a secondary chamber; releasing oxygen together with the gas waste outwardly from an external output of the secondary chamber, and capturing liquid residue obtained from the process.

10. The process according to claim 9, wherein in i) the gases enter the main chamber at a temperature above 50° C., and entering of the gases is facilitated by the suction power of a centrifugal extractor located on an outside portion of the secondary chamber.

11. The process according to claim 9, wherein in i), the gases are contacted with a curtain of saturated steam at a temperature not exceeding 100° C. and a pressure of 1 to 3 bars.

12. The process according to claim 9, wherein in iii), oxygen is outwardly released together with gaseous waste such that released gaseous waste flow is not greater than a tenth of a flow of original entry of gases and the release of oxygen together with the gaseous waste to the outside of the secondary chamber is by a high performance centrifugal extractor.

13. The process according to cairn 9, wherein temperature inside the main chamber is greater than 40° C. on average, the gases are saturated with moisture and water vapor sprayed to the steam curtain has a maximum temperature of 100° C. and a pressure lower than 3 bars.

* * * * *